P. WEINIG.
Malt-Kiln Floor.

No. 168,948.  Patented Oct. 19, 1875.

Section AB.

Witnesses.  Inventor.
Paul Weinig
per atty.
A. H. Evans & Co.

UNITED STATES PATENT OFFICE.

PAUL WEINIG, OF HANAU, PRUSSIA, ASSIGNOR TO FREDERICK W. WOLF, OF CHICAGO, ILLINOIS.

IMPROVEMENT IN MALT-KILN FLOORS.

Specification forming part of Letters Patent No. 168,948, dated October 19, 1875; application filed July 17, 1875.

*To all whom it may concern:*

Be it known that I, PAUL WEINIG, of Hanau, Prussia, have invented a new and useful Improvement in Malt-Kiln Floors, of which the following is a clear, full, and exact description, reference being had to the accompanying drawings, making a part of this specification, in which—

Figure 1:
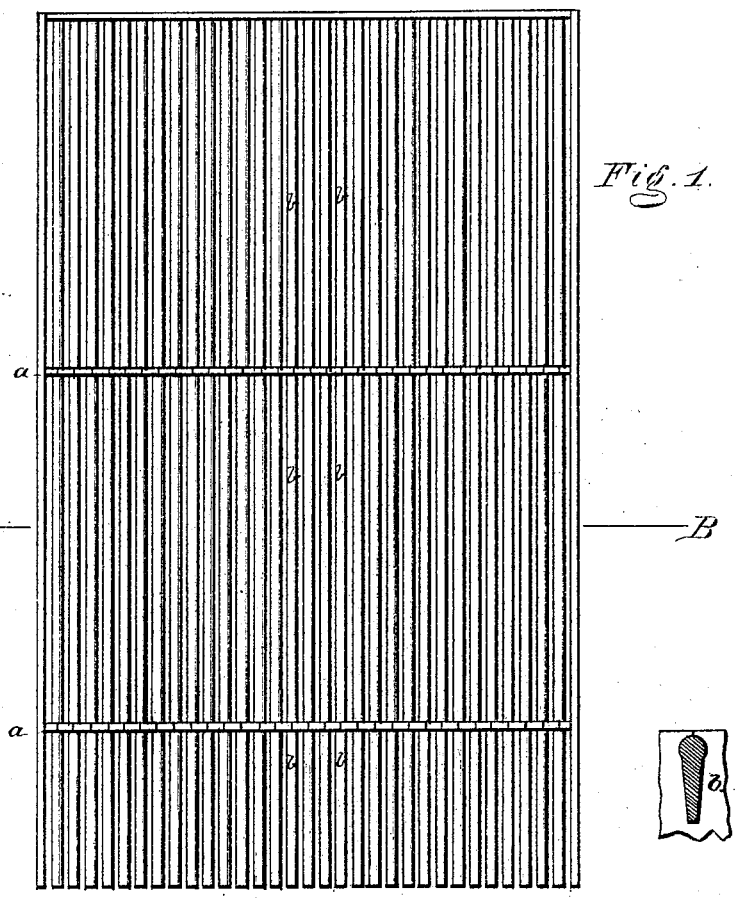
Figure 2:
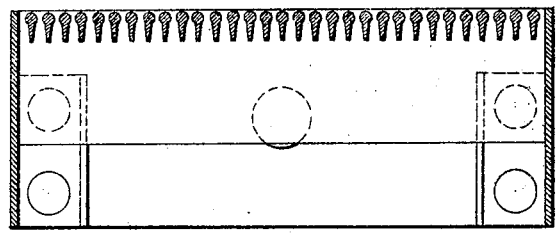

Figure 1 is a plan view of a section of my floor. Fig. 2 is a cross-section of same.

My invention has reference to the floors of kilns used in breweries; and it consists in constructing the floor in sections and of blade-shaped wires secured in position, as hereinafter described and claimed.

To enable others skilled in the art to make and use my invention, I will proceed to describe the exact manner in which I have carried it out.

In the drawings, A and B represent the frame-work of a section of my improved floor, with the cross-ties *a a* riveted securely to hold the frame together and support the flooring of blade-shaped bars or wires *b b*, placed with their edges downward and secured in position, as hereinafter described.

These floors have heretofore been woven of wire, the round wire of the wire-cloth being pressed after weaving to produce a flat surface, or of wire rolled or otherwise compressed into wedge-shaped rails, which rails were perforated and strung together on rods passing through the perforations.

It is evident that the rails must be materially weakened and injured by the holes made through them. I overcome this objection, and by my improvement I not only get a much greater percentage of opening, but secure a much stronger, cheaper, and convenient floor, and the blade shape of the bars or wires prevents the floor from choking.

By forming my floor in sections or blocks, these can be readily renewed or replaced, and a floor repaired with comparatively little expense.

The wires or rods are keyed straight and then secured at the ends and to the cross-ties by swaging down the metal of the cross-ties upon the wires or rods, as shown in Fig. 2.

It is evident that this floor is applicable to elevators, mills, and other similar buildings for screening purposes, as also in grain-drying apparatus.

Having thus described my invention, what I claim as new, and desire to secure by Letters Patent, is—

A malt-kiln floor constructed in sections and consisting of the frame A, cross-ties *a a*, and blade-shaped rods or wires *b b* secured by swaging down upon them the metal of the cross-ties, substantially as and for the purpose set forth.

PAUL WEINIG.

Witnesses:
WM. P. WEBSTER,
ALBERT J. DE ZEYK.